(12) United States Patent
Futatsugi

(10) Patent No.: US 9,189,499 B2
(45) Date of Patent: Nov. 17, 2015

(54) INFORMATION PROCESSING APPARATUS AND INFORMATION PROCESSING METHOD

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 12/896,638

(22) Filed: Oct. 1, 2010

(65) Prior Publication Data

US 2011/0082886 A1  Apr. 7, 2011

(30) Foreign Application Priority Data

Oct. 6, 2009 (JP) ................................. 2009-232494

(51) Int. Cl.
*G06F 17/30* (2006.01)

(52) U.S. Cl.
CPC ...... *G06F 17/30265* (2013.01); *G06F 17/3069* (2013.01); *G06F 17/30333* (2013.01); *G06F 17/30539* (2013.01)

(58) Field of Classification Search
CPC .................... G06F 17/30265; G06F 17/30333; G06F 17/30539; G06F 17/3069
See application file for complete search history.

(56) References Cited

U.S. PATENT DOCUMENTS

2010/0223276 A1*  9/2010  Al-Shameri et al. .......... 707/769

FOREIGN PATENT DOCUMENTS

| JP | 11-134344 A | 5/1999 |
|---|---|---|
| JP | 2002-024265 A | 1/2002 |

* cited by examiner

*Primary Examiner* — Ann Lo
(74) *Attorney, Agent, or Firm* — Canon USA, Inc. IP Division

(57) ABSTRACT

An information processing apparatus acquires a first metadata value of first metadata from a content to be assigned metadata, performs a first search from contents by the first metadata using the first metadata value as a search condition, acquires a second metadata value of second metadata different from the first metadata from one or more contents included in a set of a result of the first search, performs a second search from the contents by the second metadata using the second metadata value as a search condition, finds a degree of similarity between the set of the result of the first search and a set of a result of the second search, and assigns, according to the degree of similarity, the second metadata value as metadata of the content to be assigned metadata.

6 Claims, 12 Drawing Sheets

PHOTOGRAPH
MANAGEMENT APPLICATION

METADATA ASSIGNMENT COMMAND

RESPONSE MESSAGE

FIG.7

| NUMBER OF IMAGES OF SIMILAR IMAGE SEARCH RESULT (M) 701 | METADATA VALUE 702 | APPEARANCE FREQUENCY OF METADATA VALUE 703 | NUMBER OF IMAGES OF METADATA SEARCH RESULT (N) 704 | OVERLAP COUNT (R) 705 | OVERLAP RATIO R/(M+N-R) 706 | METADATA TO BE ASSIGNED |
|---|---|---|---|---|---|---|
| 100 | IMPERIAL PALACE | 25 | 350 | 130 | 0.40 | |
| | NIJYU BRIDGE | 15 | 180 | 120 | 0.75 | ○ |
| | MAIN GATE OF IMPERIAL PALACE | 10 | 150 | 85 | 0.51 | |
| | TOKYO | 3 | 1500 | 16 | 0.01 | |
| | MOAT | 2 | 60 | 8 | 0.05 | |

PHOTOGRAPH MANAGEMENT APPLICATION

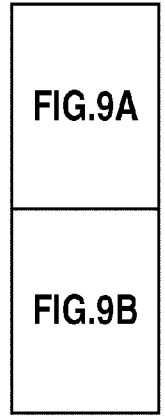
FIG.9A
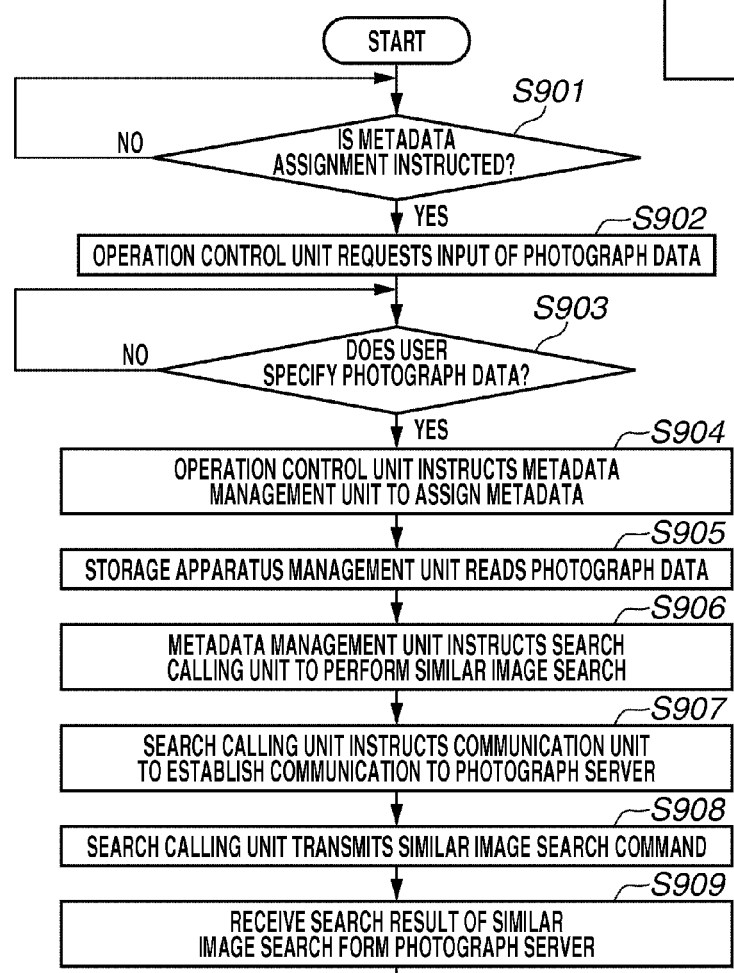

INFORMATION PROCESSING APPARATUS AND INFORMATION PROCESSING METHOD

BACKGROUND OF THE INVENTION

1. Field of the Invention

The present invention relates to a metadata assignment method and a metadata assignment apparatus, and more particularly, to a technique that is adapted to be used for assignment of metadata, such as the name of a location and the name of an object, to a photograph.

2. Description of the Related Art

A method for assigning metadata, such as the name of a location and the name of an object, to a photograph for management of the photograph has started to be generalized. For example, photographs with metadata assigned thereto by users are published on a photograph sharing site on the web. If a user assigns metadata only to a small number of photographs, such as photographs to publish on the web, manual assignment of metadata is possible. However, for example, if a user tries to manually assign metadata to all of a large number of travel photos, this becomes a heavy burden to the user.

Under this circumstance, there has been proposed a method of utilizing metadata assigned to a similar image. For example, Japanese Patent Application Laid-Open No. 2002-024265 discusses a method of searching similar images on a photograph sharing site with use of a photograph to which a user wants to assign metadata as a query, extracting a plurality of metadata from photographs of the search result, and allowing the user to select which metadata is assigned to the target photograph.

Further, Japanese Patent Application Laid-Open No. 11-134344 discusses a method of searching similar images with use of a photograph which a user wants to assign metadata as a query, and assigning the same metadata as the metadata of the search result if the user determines that the image of the search result is actually similar to the target photograph.

The metadata assigned to photographs on, for example, a photograph sharing site, are basically assigned by users manually, and selected based on the users' subjective views. As such, it is inevitable that some photos are assigned metadata that fail to indicate the name of a location or the name of an object, and other photos are assigned metadata having poor representataiveness of the location or the object. Therefore, in conventional methods of assigning metadata based on similarity of an image, even if an image having extremely high similarity is found, assignment of appropriate metadata as the name of a location or the name of an object may not be able to be expected.

The same problem arises in a method of determining the location of a photograph based on the global positioning system (GPS) data, and utilizing metadata assigned to a photograph which was taken at a nearby place. In this case, the problem is that accurate determination of the location where the photograph was taken according to the GPS does not necessarily results in assignment of appropriate metadata.

SUMMARY OF THE INVENTION

The present invention is directed to enabling assignment of appropriate metadata representative of an image when metadata is assigned to a photograph with use of similarity indicated by an image feature amount to a photograph with metadata already assigned thereto.

According to an aspect of the present invention, an information processing apparatus for assigning metadata to a content includes a storage unit configured to store a content with metadata assigned thereto in a storage apparatus, a first acquisition unit configured to acquire a first metadata value of first metadata from a content to be assigned metadata, a first search unit configured to perform a first search from contents stored in the storage apparatus by the first metadata using the first metadata value acquired by the first acquisition unit as a search condition, a second acquisition unit configured to acquire a second metadata value of second metadata different from the first metadata from one or more contents included in a set of a result of the first search, a second search unit configured to perform a second search from the contents stored in the storage apparatus by the second metadata using the second metadata value acquired by the second acquisition unit as a search condition, a comparison unit configured to find a degree of similarity between the set of the result of the first search and a set of a result of the second search, and an assignment unit configured to assign, according to the degree of similarity, the second metadata value as metadata of the content to be assigned metadata.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of the number of images of a search result and an example of an overlap ratio between sets.

DESCRIPTION OF THE EMBODIMENTS

Various exemplary embodiments, features, and aspects of the invention will be described in detail below with reference to the drawings.

Figure 1A:
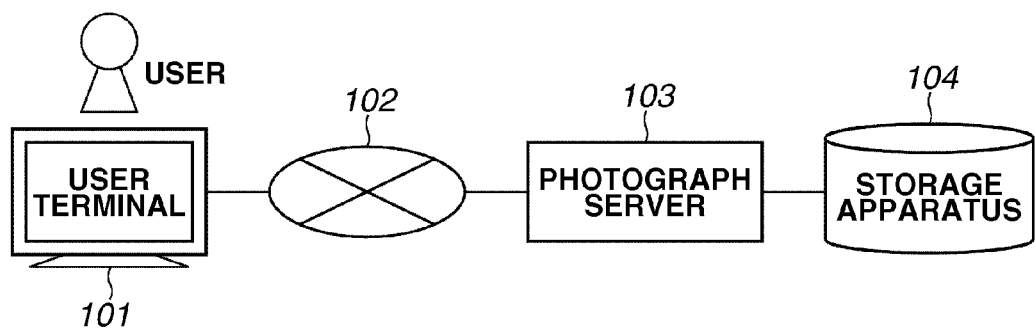
FIGS. 1A and 1B respectively illustrate an example of a configuration of a photograph management system and an example of a configuration of a photograph management application according to an exemplary embodiment of the present invention.

FIG. 1A illustrates an overall configuration of a photograph management system according to an exemplary embodiment of the present invention. A user terminal 101 includes a storage apparatus for storing data of a photograph taken by a user as a content. Further, a photograph management application for managing a stored photograph is executably installed in the user terminal 101. For example, the user terminal 101 is embodied by a personal computer (PC) or a mobile terminal.

Photograph data is uploaded to a photograph server 103 from the user terminal 101, which is connected to the photograph server 103 via a network 102. An uploaded photograph is stored in a storage apparatus 104 as a content to be used by the photograph server 103. Further, the photograph server 103 has a metadata assignment function according to the present exemplary embodiment, and a user can utilize the metadata assignment function of the server 103 via the photograph management application.

Figure 1B:
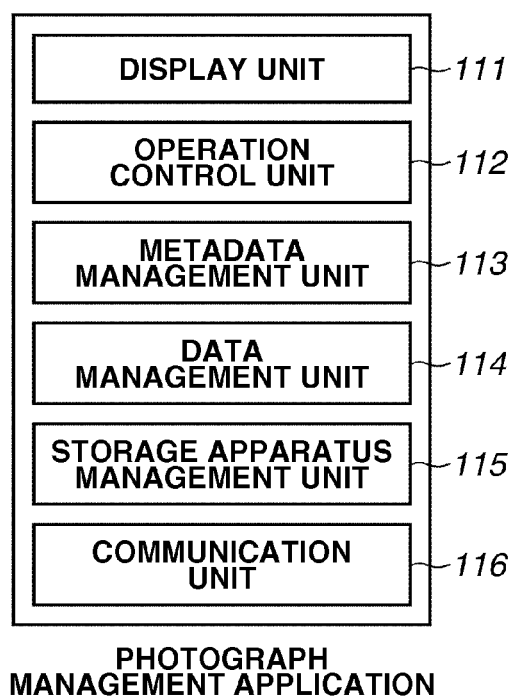

FIG. 1B illustrates a functional module configuration of the photograph management application installed in the user terminal 101.

A display unit 111 controls display of photographs and various user interfaces.

An operation control unit 112 performs control according to an operation of a user, and calls various functions.

A metadata management unit 113 manages metadata assigned to a photograph, and stores and reads out metadata via a storage apparatus management unit 115.

A data management unit 114 manages a main body of photograph data, and stores and reads out photograph data via the storage apparatus management unit 115

The storage apparatus management unit 115 reads out and writes in data by accessing the storage apparatus mounted on the user terminal 101. It should be noted that the storage apparatus is not limited to that in the present exemplary embodiment, and may be embodied by any means such as a file system or a database.

A communication unit 116 accesses the photograph server 103 via the network 102. It should be noted that the communication means is also not limited to that in the present exemplary embodiment.

Figure 2:
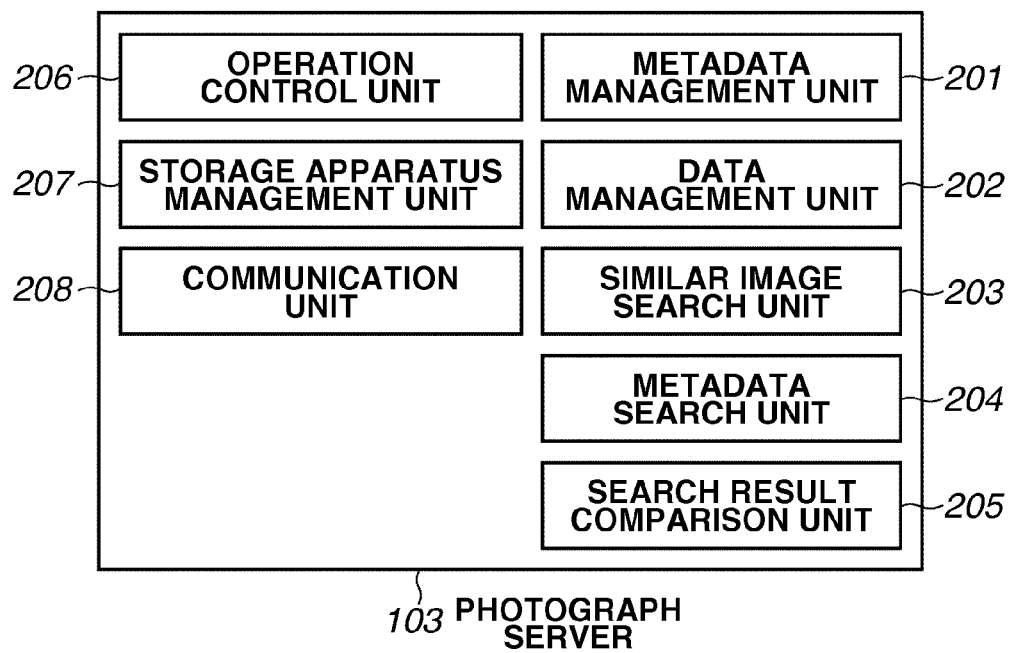
FIG. 2 illustrates a module configuration of a photograph server.

FIG. 2 illustrates an example of a module configuration of the photographs server 103.

A metadata management unit 201 manages metadata assigned to a photograph. In particular, the metadata management unit 201 acquires metadata from a photograph, assigns metadata to a photograph, and stores and reads out metadata via a storage apparatus management unit 207

A data management unit 202 manages a main body of photograph data, and stores and reads out photograph data via the storage apparatus management unit 207.

A similar image search unit 203 is a module performing a first search, and searches similar images based on an image feature amount of a photograph. Further, the similar image search unit 203 generates an index required for the similar image search.

A metadata search unit 204 is a module for performing a second search, and searches metadata assigned to a photograph. Further, the metadata search unit 204 generates an index required for the metadata search.

A search result comparison unit 205 compares a result of a metadata search by the metadata search unit 204 with a result of a similar image search by the similar image search unit 203.

An operation control unit 206 analyses a command transmitted from the photograph management application on the user terminal 101, and controls activation of modules required for processing according to the command.

The storage apparatus management unit 207 reads out and writes in data by accessing the storage apparatus 104.

A communication unit 208 establishes communication with the photograph management application on the user terminal 101.

Figure 3:
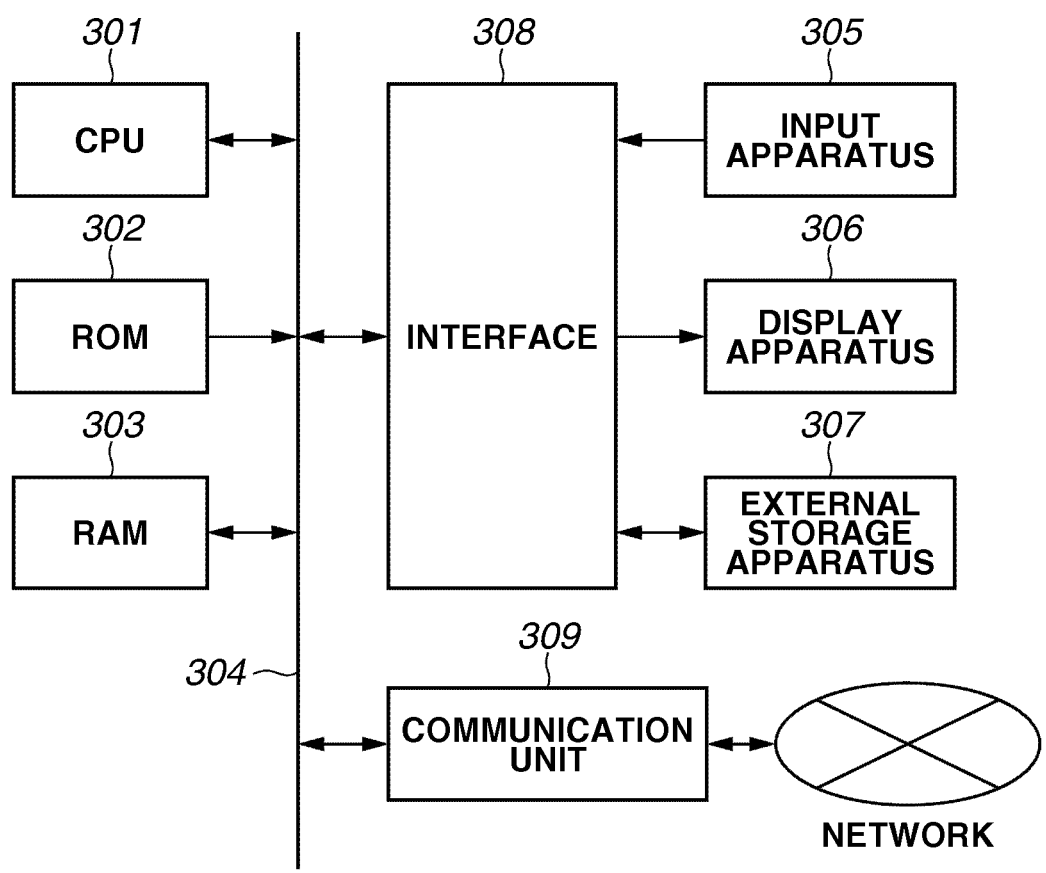
FIG. 3 illustrates an example of a configuration of a computer system.

FIG. 3 illustrates an example of a configuration of a computer system used as the photograph server 103.

A central processing unit (CPU) 301 executes an operating system (OS) and various application programs, and controls the respective units of the computer apparatus.

A read-only memory (ROM) 302 stores fixed data of parameters for use in programs and calculations executed by the CPU 301.

A random access memory (RAM) 303 provides a work area for the CPU 301 and a temporary storage area for data. The ROM 302 and the RAM 303 are connected to the CPU 301 via a bus 304.

Further, an input apparatus 305 (for example, a keyboard), a display apparatus 306 (for example, a cathode-ray tube (CRT) display or a liquid display), and an external storage apparatus 307 (for example, a hard disk apparatus, a magneto-optical (MO) disc, or a compact disc read-only memory (CD-ROM)) are connected to the bus 304 via an interface 308. Further, the bus 304 is connected to the network via the communication unit 309.

Figure 4A:
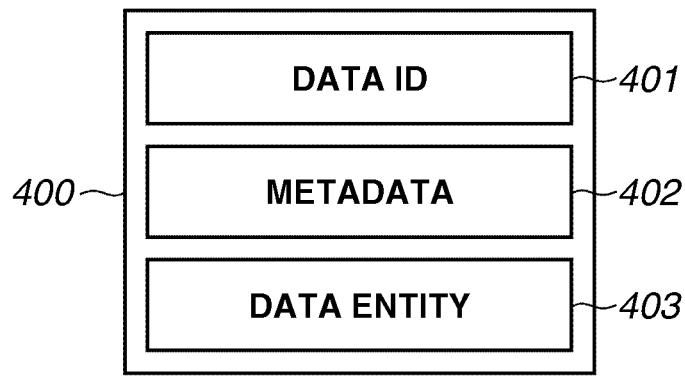
FIGS. 4A to 4C illustrate examples of data structures, respectively.

FIG. 4A illustrates an example of a data structure of photograph data 400 used in the present exemplary embodiment. Although the photograph data 400 may have any structure, it is assumed for simplification of description that the present exemplary embodiment uses only metadata of an object. Further, it is assumed that the photograph management application on the user terminal 101 and the photograph server 103 use a common data structure.

A data ID 401 is an identifier for uniquely identifying data, metadata 402 is metadata of an object, and a data entity 403 is a pointer to an entity file of photography data.

Figure 5:
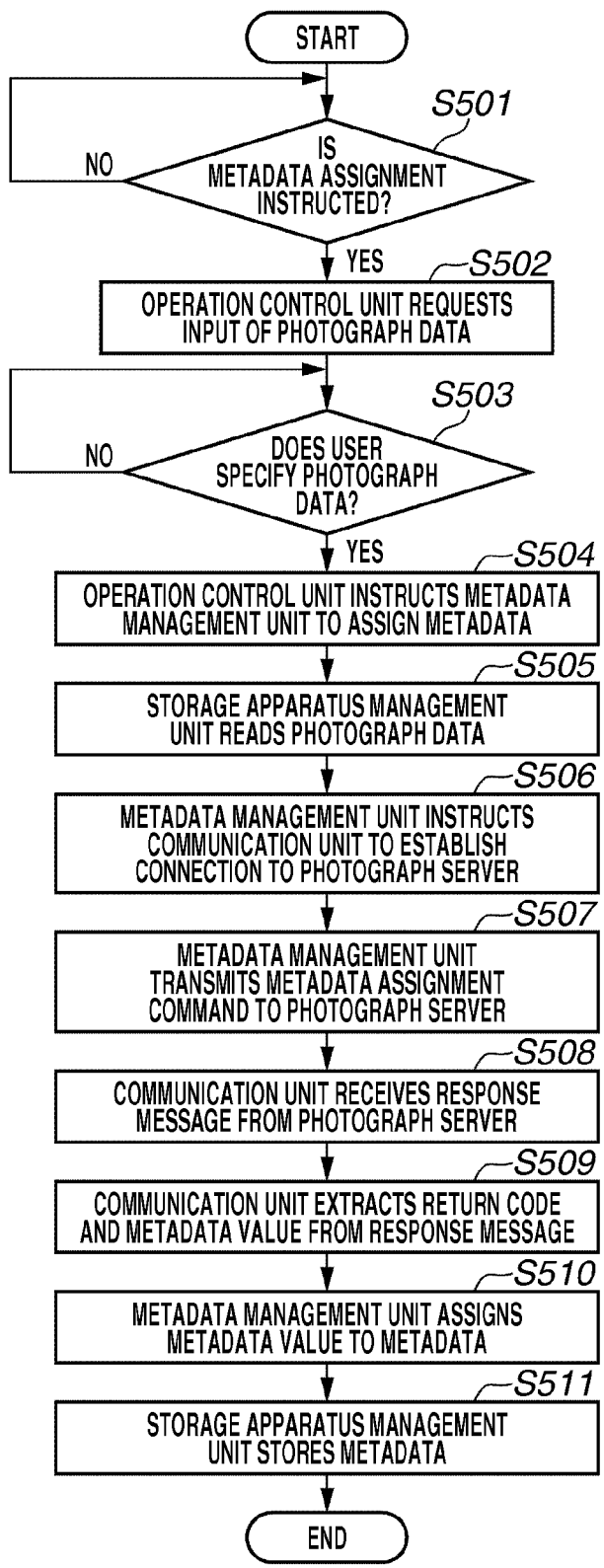
FIG. 5 is a flowchart illustrating a first example of a procedure for metadata assignment processing.
Figure 6A:
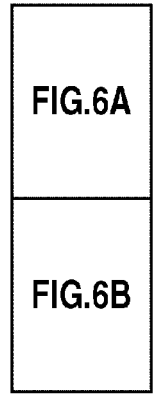
FIG. 6, composed of FIGS. 6A and 6B, is a flowchart illustrating a second example of the procedure for the metadata assignment processing.
Figure 6A:
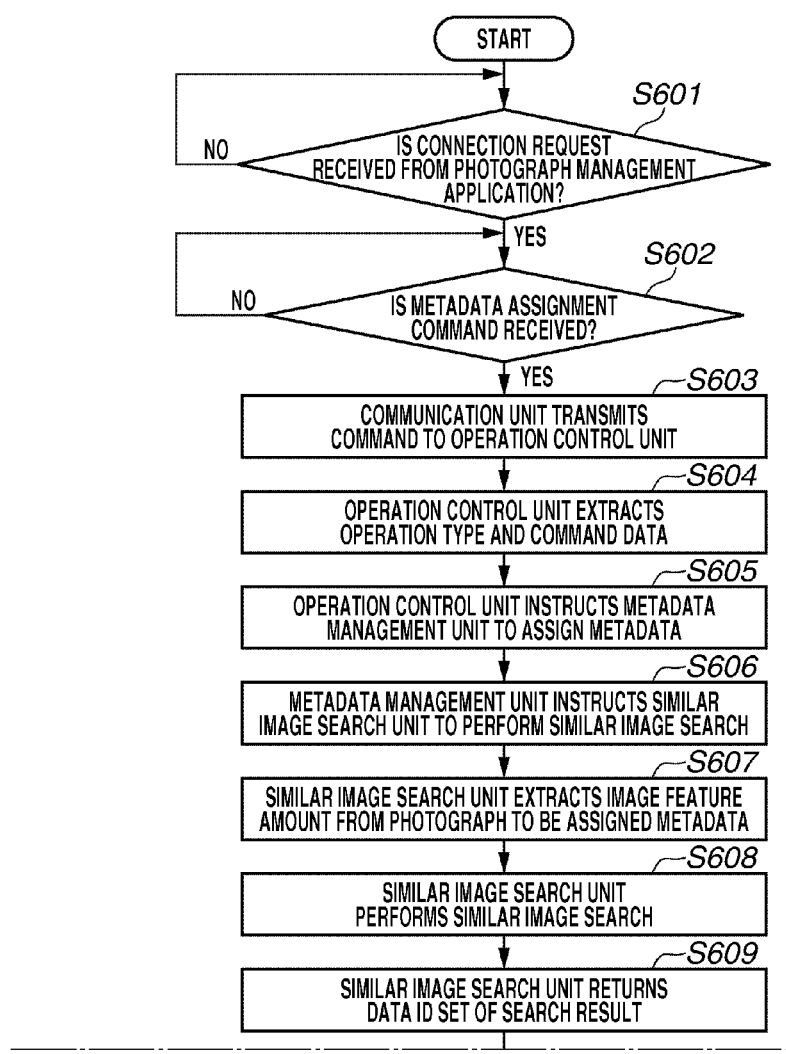
Figure 6B:
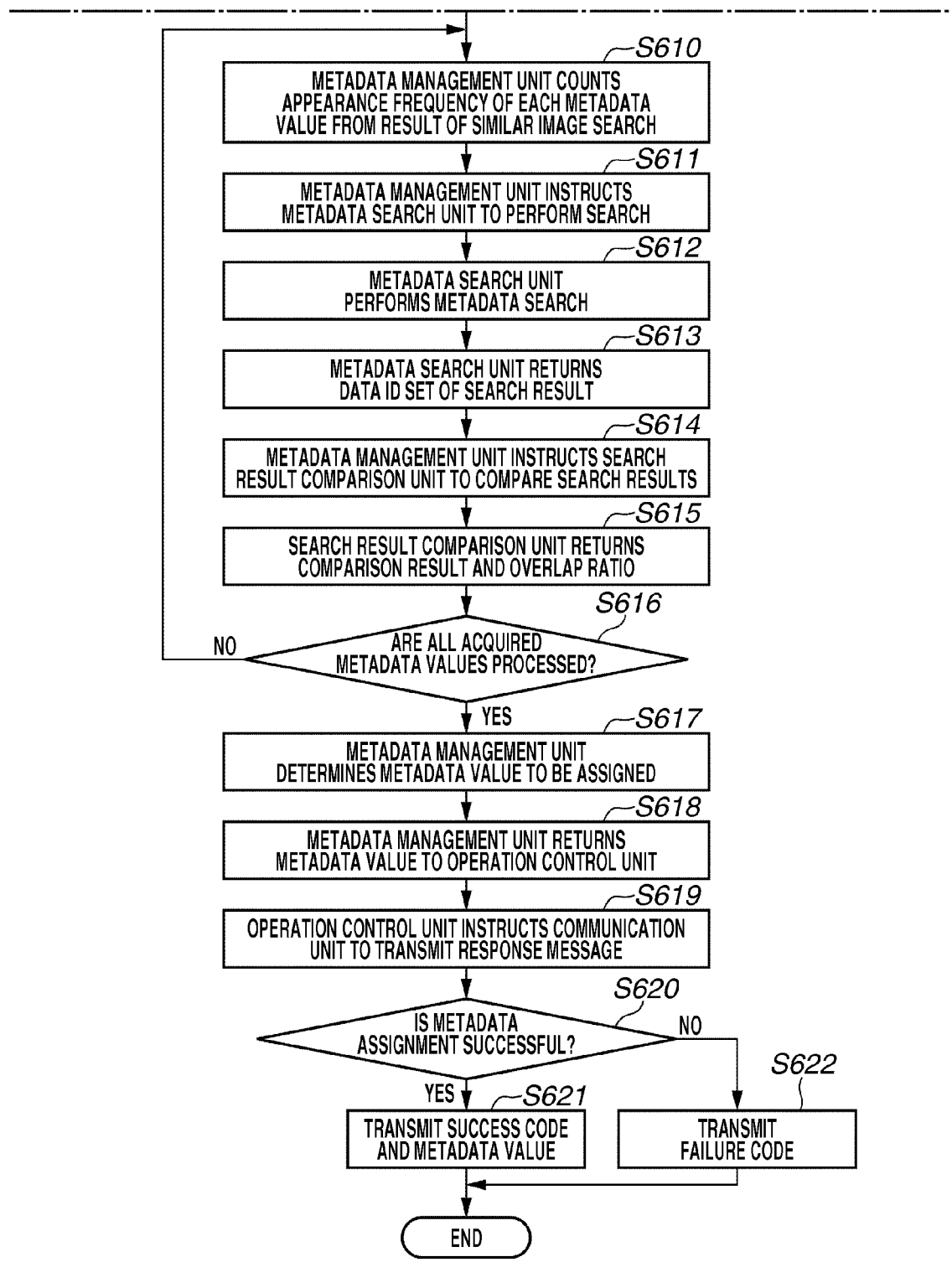

The processing of assigning metadata to a photograph will now be described with reference to the flowcharts of FIGS. 5 and 6. A description will be given of the procedure of assigning metadata to an image which is stored in the user terminal 101 and does not have metadata assigned thereto yet.

In step S501, the operation control unit 112 determines whether a user performs an operation for instructing the photograph management application on the user terminal 101 to assign metadata to a photograph with use of the photograph server 103.

If this instruction is issued (YES in step S501), the processing proceeds to step S502, in which the operation control unit 112 requests an input of photograph data to be assigned metadata. If the instruction is not issued (NO in step S501), the operation control unit 112 waits until the instruction is issued.

In step S503, the operation control unit 112 waits until the user specifies photograph data to be assigned metadata from photograph data stored in the user terminal 101. In the present exemplary embodiment, it is assumed that photograph data is stored in the form of a file per data, and, therefore, the user specifies a file path of photograph data.

If the user specifies photograph data when the operation control unit 112 is in a standby status in step S503 (YES in step S503), the processing proceeds to step S504, in which the operation control unit 112 instructs the metadata management unit 113 to assign metadata with use of the photograph server 103.

In step S505, the metadata management unit 113 instructs the storage apparatus management unit 115 to acquire the specified photograph data. The storage apparatus management unit 115 reads the photograph data based on the specified file path.

In step S506, the metadata management unit 113 instructs the communication unit 116 to establish a connection to the photograph server 103. It is assumed that the photograph server 103 as the connection destination is registered in the photograph management application in advance. Further, it is assumed that, if user authentication is applied to an access to the photograph server 103, authentication information required for user authentication is also registered in the photograph management application in advance.

After the connection unit 116 establishes a connection to the photograph server 103, in step S507, the metadata management unit 113 transmits a metadata assignment command to the photograph server 103 via the connection unit 116.

Figure 4B:
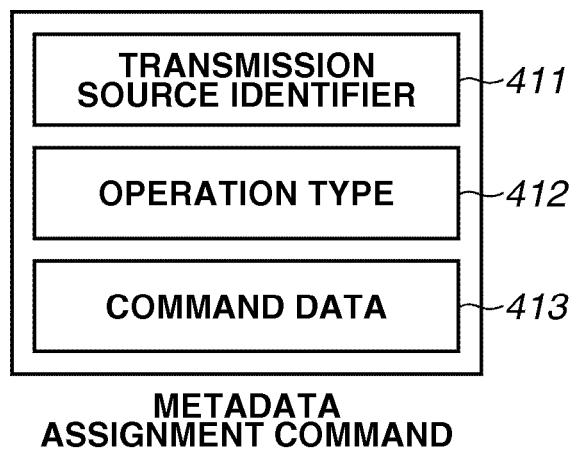

FIG. 4B illustrates an example of a data structure of the metadata assignment command.

A transmission source identifier 411 is an identifier of the photograph management application that transmits this command.

A operation type 412 is an identifier for specifying the operation to be performed on the photograph server 103 side. In this example, "METADATA ASSIGNMENT" is set as the operation type 412. It should be noted that, in addition to "METADATA ASSIGNMENT", other commands such as "PHOTOGRAPH UPLOAD" and "SEARCH" can be set as the operation type 412. For example, the "PHOTOGRAPH UPLOAD" command causes generation of an index of an uploaded photograph.

Command data 413 is data required for execution of the operation, and in this example, the photograph data to be assigned metadata is set thereto.

After metadata is assigned at the photograph server 103, in step S508, a response message to the metadata assignment command is received by the communication unit 116.

In step S509, the communication unit 116 extracts a return code and a metadata value from the response message, and returns them to the metadata management unit 113. The metadata management unit 113 performs processing of acquiring the metadata value returned from the communication unit 116 as a metadata value of first metadata (first acquisition processing of acquiring a first metadata value)

In step S510, the metadata management unit 113 sets the acquired metadata value of the first metadata to the metadata 402 of the photograph data 400.

In step S511, the storage apparatus management unit 115 stores the set metadata into the storage apparatus 104. The assigned metadata value may be displayed on the display unit 111.

The above-described processing is the procedure of the metadata assignment processing at the user terminate 101.

The processing at the photograph server 103 side will now be described with reference to FIGS. 6 and 7. This processing is activated in steps S506 and S507.

In step S601, the communication unit 208 determines whether a connection request is received from the photograph management application. If the connection request is not received (NO in step S601), the photograph server 103 waits until a reception thereof.

If the connection request is received (YES in step S601), the processing proceeds to step S602, in which the communication unit 208 determines whether a metadata assignment command is received from the photograph management application. As a result of this determination, if it is determined that the metadata assignment command is received (YES in step S602), the processing proceeds to step S603. If not (NO in step S602), the communication unit 208 waits until a reception thereof.

In step S603, the communication unit 208 transmits the received command to the operation control unit 206.

In step S604, the operation control unit 206 analyses the command acquired from the communication unit 208, and extracts "METADATA ASSIGNMENT" as the operation type and the photograph data as the command data.

In step S605, the operation control unit 206 instructs the metadata management unit 201 to assign metadata to the restored photograph data.

In step S606, the metadata management unit 201, which has received the instruction of metadata assignment, first searches images similar to the photograph data specified by the operation control unit 206. The metadata management unit 201 performs first acquisition processing by generating a search condition with use of the specified photograph data as a query image, instructing the similar image search unit 203 to perform a similar image search, and acquiring the search result.

In step S607, the similar image search unit 203 extracts an image feature amount from the specified query image.

In step S608, the similar image search unit 203 performs a similar image search based on indices.

In step S609, the similar image search unit 203 returns a set of data IDs as the search result to the metadata management unit 201.

In the present exemplary embodiment, the metadata management unit 201 counts an appearance frequency of each of metadata values acquired from the similar image search. Here, it is assumed that 100 images are returned as the search result as shown in the number of images of similar image search result 701 in FIG. 7. In the present exemplary embodiment, the similar image search unit 203 returns as the search result only images the image feature amount of which has similarity exceeding a predetermine threshold value. The metadata management unit 201, which has acquired the result of the similar image search performed by the similar image search unit 203, then performs a metadata search.

In step S610, the metadata management unit 201 acquires a metadata value 702 of an object from each of the photograph data identified by the data IDs of the search result of the similar image search, and counts an appearance frequency 703 of the acquired metadata value.

In step S611, the metadata management unit 201 generates a search query (metadata value of second metadata) with use of the acquired metadata value as a matching condition, and instructs the metadata search unit 204 to perform a search, in descending order of the appearance frequency.

In step S612, the metadata search unit 204 performs a search based on the indices of all photograph data stored in the photograph server 103 according to the specified search query (second metadata value).

In step S613, the metadata search unit 204 returns a set of data IDs as the search result to the metadata management unit 201.

In step S614, the metadata management unit 210, after performing second acquisition processing of acquiring the search result of the metadata search, instructs the search result comparison unit 205 to compare the before-acquired search result of the similar image search with the search result of the metadata search. The search result comparison unit 205 analyses "closeness" between the two search results specified by the metadata management unit 201. In the present exemplary embodiment, since sets of data IDs are acquired as the search results, the closeness between the results is evaluated from the overlap ratio of the data IDs. It is determined that the search result of the metadata search and the search result of the similar image search are "close" if the following equation (1) is satisfied:

$$R/(M+N-R) > r \quad (1)$$

in which M represents the number of images of a similar image search result (701), N represents the number of images of a metadata search result (704), R represents the number of data IDs redundantly included in both search results (705), and r represents a threshold value of the overlap ratio (706).

In step S615, the search result comparison unit 205 returns the determination result and the calculated overlap ratio to the metadata management unit 201. The metadata management unit 201, if the determination result is "close", determines to assign the metadata value which has obtained this metadata search result as metadata of the photograph data.

In step S616, if a plurality of metadata values exists when the appearance frequency is counted in step S610, the metadata management unit 201 determines whether all of the acquired metadata values are processed. As a result of this determination, if not all of the metadata values are processed (NO in step S616), the processing returns to step S610, and the metadata management unit 201 repeats the above-described processing.

If a plurality of metadata values exists, in step S617, the search result comparison unit 205 compares the search results of the respective metadata values. Then, the search result comparison unit 205 selects the metadata value that has the highest overlap ratio from the metadata values determined as being "close", and determines to assign it as metadata of the photograph data.

FIG. 7 illustrates an example of the metadata value, the number of the images of the result, and the overlap ratio. This example indicates that "IMPERIAL PALACE" has the highest appearance frequency of the metadata value but "NIJYU BRIDGE" has the highest overlap ratio, and, therefore, "NIJYU BRIDGE" is selected as a metadata value to be assigned.

After the metadata value to be assigned to the photograph data is determined, in step S618, the metadata management unit 201 returns the metadata value to the operation control unit 206.

Figure 4C:
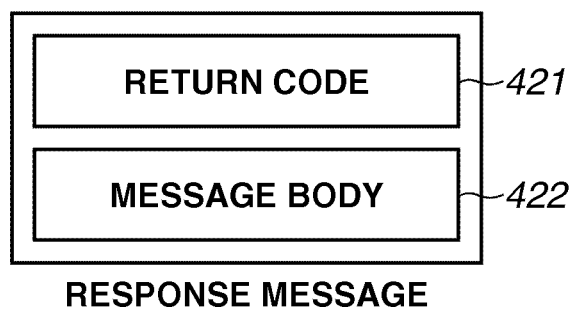

In step S619, the operation control unit 206, which has acquired the metadata value, instructs the communication unit 208 to transmit the metadata value and a return code indicating a success in the metadata assignment as a response message to the metadata assignment command received from the photograph management application. FIG. 4C illustrates an example of the structure of the response message. Either SUCCESS or FAILURE is set in a return code 421, and a metadata value is set in a message body 422.

In step S620, the operation control unit 206 determines whether the metadata assignment is successfully completed or results in a failure.

If the metadata assignment is successfully completed (YES in step S620), the processing proceeds to step S621, in which the communication unit 208 transmits the specified metadata value and the return code to the photograph management application.

If the metadata assignment results in a failure (NO in step S620), i.e., there is no metadata value determined as being close at the search result comparison unit 205, since no assignable metadata exists, then in step S622, the operation control unit 206 instructs the communication unit 208 to transmit a return code indicating a failure in the metadata assignment as a response message.

The above-described processing is the procedure of the metadata assignment processing at the photograph server 103 side. In the present exemplary embodiment, the appearance frequency of each metadata value is counted in step S610, and the metadata search is performed in descending order of the appearance frequency. However, the metadata search may be performed, starting with the metadata value assigned to the photograph having a high matching degree in the similar image search.

According to the above-described exemplary embodiment, closeness between a set of contents acquired from a similar image search or a comparison of similarity of GPS data, and a set of contents acquired from a metadata search is compared, and the metadata for which the both sets are close is selected. Therefore, it is possible to assign a representative metadata value to an image.

It is possible to automatically assign metadata representative of an object to a user's photograph by utilizing a photograph with metadata of the object already assigned thereto, and thereby possible to reduce a user's time and effort required for photograph management.

A second exemplary embodiment of the present invention will now be described. In the above-described first exemplary embodiment, the photograph server 103 has the function and apparatus for metadata assignment. In the present exemplary embodiment, the photograph management application on the user terminal 101 has this function.

Figure 8:
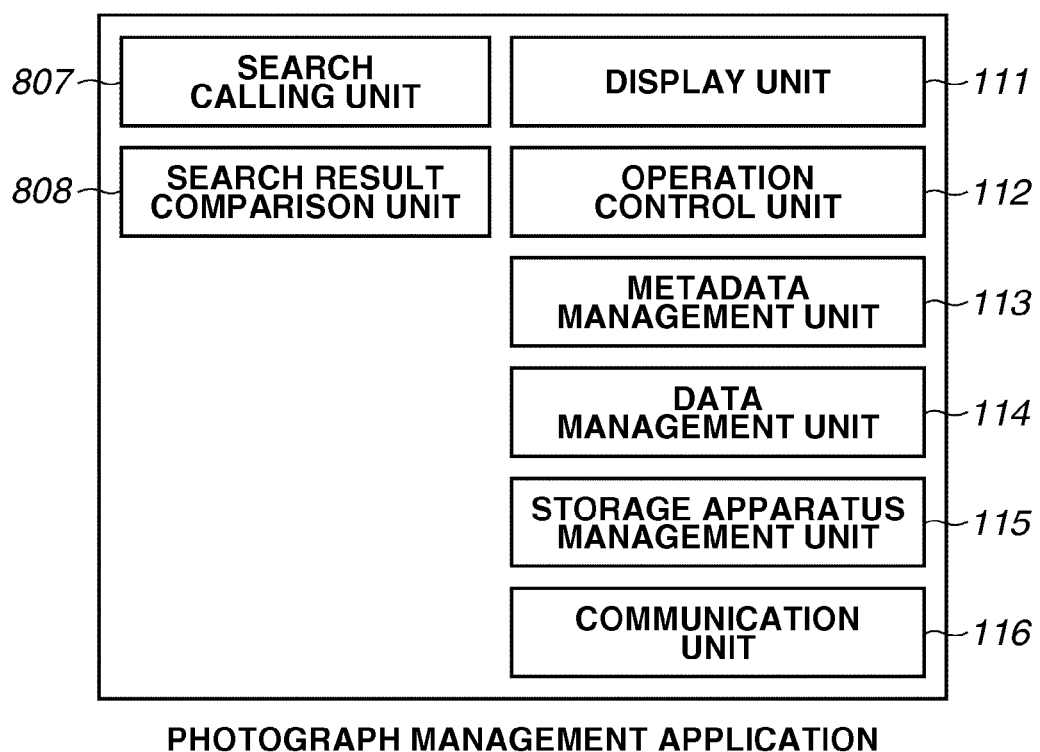
FIG. 8 illustrates a second example of the module configuration of the photograph management application.

FIG. 8 illustrates a functional module configuration of a photograph management application according to the present exemplary embodiment. In FIG. 8, the modules identified by reference numerals 111 to 116 are similar to the modules shown in FIG. 1B, and, therefore, the descriptions thereof are not repeated here.

A search calling unit 807 executes the search function on the photograph serve 103 via the communication unit 116.

A search result comparison unit 808 is a functional module similar to the search result comparison unit 205 on the photograph serve 103.

Figure 9B:
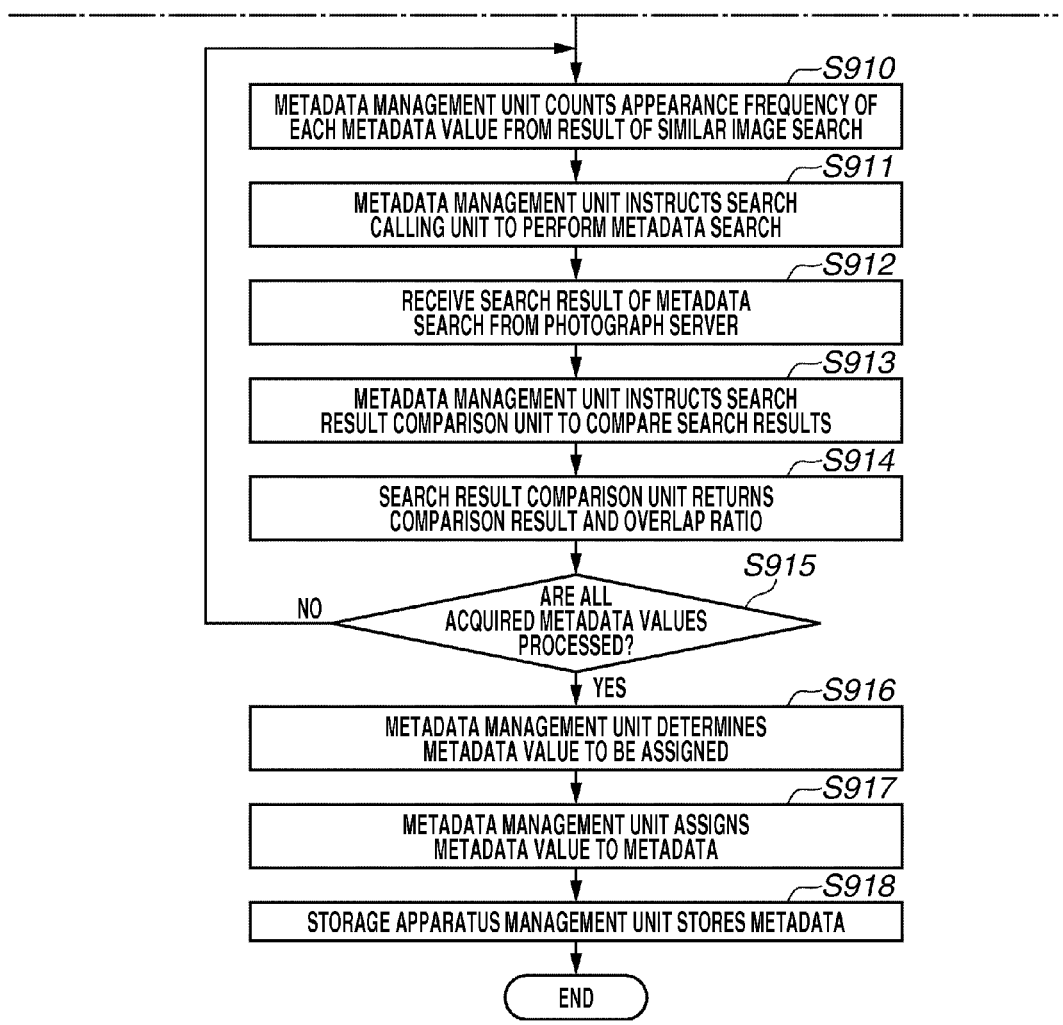
FIG. 9, composed of FIGS. 9A and 9B, is a flowchart illustrating a third example of the procedure for the metadata assignment processing.

An example of the procedure of the metadata assignment processing according to the present exemplary embodiment will be described with reference to the flowchart of FIG. 9.

In steps S901 to S905, a user specifies photograph data to be assigned metadata to the photograph management application, and the photograph management application reads the photograph data from the storage apparatus. These steps are similar to steps S501 to S505 in the first exemplary embodiment, and, therefore, the descriptions thereof are not repeated here.

In step S906, the metadata management unit 113 performs a similar image search. In the present exemplary embodiment, the metadata management unit 113 generates a search condition with use of the specified photograph data as a query image to the search calling unit 807, and instructs the search calling unit 807 to perform the similar image search.

In step S907, the search calling unit 807 instructs the communication unit 116 to establish a connection to the photograph server 103.

In step S908, the communication unit 116 transmits a similar image search command to the photograph server 103.

In step S909, the photograph server 103 performs the similar image search according to the similar image search command received from the photograph management application, and returns a set of photograph data as the search result to the photograph management application. The similar image search function executed here is similar to that in the first exemplary embodiment. The metadata management unit 113, which has acquired the search result of the similar image search, performs a metadata search subsequently.

In step S910, the metadata management unit 113 acquires the metadata 402 from the acquired set of photograph data, and counts the appearance frequency of each metadata value in the set acquired as the similar image search result. The metadata search function executed here is similar to that in the first exemplary embodiment.

In step S911, the metadata management unit 113 generates a search query of a metadata search and instructs the search calling unit 807 to perform the metadata search, with use of each metadata value in descending order of the appearance frequency.

In step S912, the search calling unit 807 transmits a metadata search command to the photograph server 103 via the communication unit 116. The photograph server 103 performs the metadata search according to the metadata search command received from the photograph management application, and returns a set of photograph data 400 to the photograph management application as the search result.

In step S913, the metadata management unit 113, which has received the search result of the metadata search, instructs the search result comparison unit 808 to compare the before-acquired search result of the similar image search and the search result of the metadata search.

In steps S914 to S916, the metadata management unit 113 determines a metadata value to be assigned according to the overlap ratio of the search results. This procedure is similar to that in the first exemplary embodiment, and the description thereof is not repeated here.

After the metadata value to be assigned is determined, in step S917, the metadata management unit 113 assigns the metadata value to the photograph data.

In step S918, when the storage apparatus management unit 115 is instructed to store the metadata, the storage apparatus management unit 115 stores the metadata. The above-described processing is the metadata assignment procedure according to the second exemplary embodiment.

In the above-described exemplary embodiments, the first search is embodied by a similar image search, and the second search is embodied by a metadata search, but an embodiment capable of carrying out the present invention is not limited to these embodiments. For example, the first search may be embodied by a metadata search with use of GPS data. In this case, for example, a range condition relative to the value of the GPS data can be used as a search query for the first search, and an embodiment including a means for generating such a query is also included in the present invention. Further, a metadata search means for performing the first search and a metadata search means for performing the second search may be embodied by a common means.

According to the present exemplary embodiment, when a location is highly relevant to an object, it is possible to assign representative metadata to the object. For example, this is especially effective for metadata assignment to a landscape photograph for which a photographable location is limited.

In the above-described exemplary embodiments, a user selects one photograph to be assigned metadata, but an embodiment capable of carrying out the present invention is not limited to these exemplary embodiments. It is possible to use a method of selecting a plurality of photographs at a time, or a method of specifying a folder where photograph data is stored to assign metadata to photographs in the folder at a time.

Further, in the above-described exemplary embodiments, a start of metadata assignment is initiated by a user's instruction. However, for example, metadata assignment may be automatically started when a digital camera is connected to the user terminal and a new photograph is read from the digital camera.

In the above-described embodiments, a similar image search is performed at the first stage of the metadata assignment processing. However, the present invention can be also carried out by narrowing down photograph data in advance with use of another search method before execution of a similar image search. For example, when a photograph to be assigned metadata is a photograph with GPS data attached thereto, and GPS data is also attached to photographs stored in the photograph server, a similar image search may be performed after narrowing down of the photographs according to GPS data.

According to the present exemplary embodiment, since search targets of a similar image search are narrowed down according to the location in advance, it is expected that photographs appropriate as the search result can be acquired even with a similar image search having low accuracy, and, therefore, it is expected that metadata appropriate for the object can be assigned thereto.

Further, a user may specify photographs obviously having a low matching degree from the result of a similar image search as data excluded from data acquisition, and the photographs specified as data excluded from data acquisition may be excluded from counting of an appearance frequency of each metadata value, and an embodiment including a means therefor is also included in the present invention. Similarly, only appearance frequencies of metadata values of photographs specified by a user as data to be acquired may be counted.

In the above-described exemplary embodiments, the system determines one metadata value to be assigned, but the system may generate a candidate list including a plurality of metadata values. Further, the candidate list may be presented to a user, and the user may select metadata to be assigned. Further, priority and reliability may be set to each metadata value, and a plurality of metadata values with such data may be assigned to a photograph. In this case, priority and reliability of a metadata value can be calculated, for example, according to "closeness" between the set of the similar image search result and the set of the metadata search result.

In the above-described exemplary embodiments, the overlap ratio of data IDs is used to determine "closeness" between sets of search results. On the other hand, in the present exemplary embodiment, "closeness" is determined based on another index.

Figure 10A:
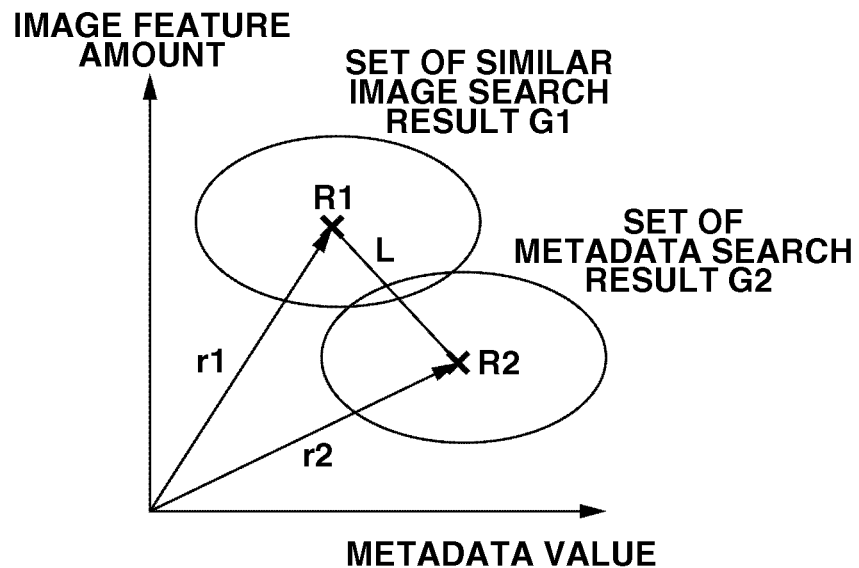
FIGS. 10A and 10B each illustrate an example of a method of determining closeness between sets.

In FIG. 10A, in an (M+N) dimensional parameter space spanned by M image feature amounts and N metadata values, a vector r1 to the median point R1 of the distribution of a set G1 of a similar image search result and a vector r2 to the median point R2 of the distribution of a set G2 of a metadata search result are calculated. Then, it is determined that the sets G1 and G2 are "close" when a distance L between the median points expressed by the following equation (2) is smaller than a predetermined threshold value:

$$L=|r1-r2| \qquad (2)$$

Figure 10B:
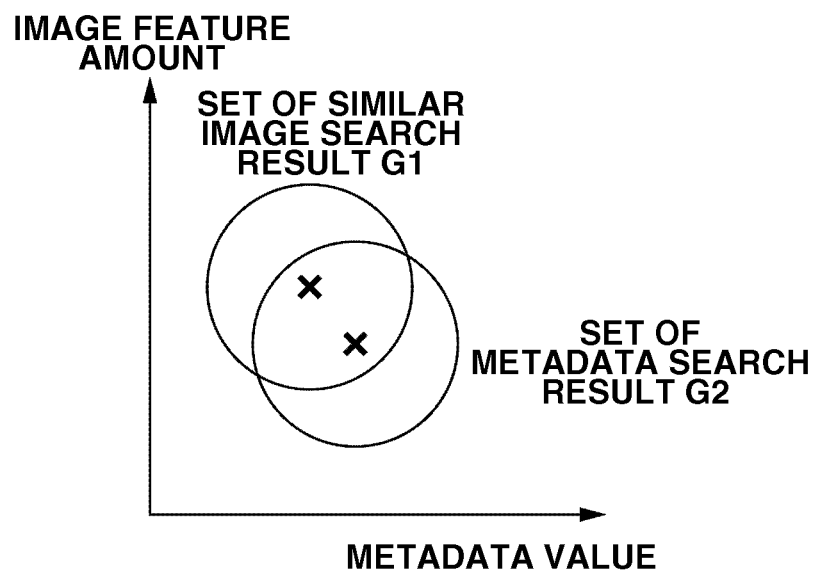

Further, in FIG. 10B, similarly, in the (M+N) dimensional parameter space spanned by M image feature amounts and N metadata values, parameters are normalized such that the distribution of the set G1 of the similar image search result and the distribution of the set G2 of the metadata search result define precise circles, respectively. In this state, it is determined that they are "close" if a median point of one of the sets is included in the distribution of the other set. Further, an embodiment in which "closeness" between sets of search results are determined by any another method than the above-described methods is also included in the scope of the present invention.

In the above-described embodiments, descriptions have been given of the methods and configurations assigning metadata at the user terminal side and the photograph server side, respectively, but a method and configuration capable of carrying out the present invention are not limited to these embodiments. For example, the present invention can be also carried out by an embodiment in which metadata is assigned to photograph data uploaded to the photograph server.

Further, in the above-described embodiments, the photograph management application is executably installed in the user terminal, but a system configuration capable of carrying out the present invention is not limited to these embodiments. For example, a method in which a web browser is executed on the user terminal and the photograph server is operated as a web server is also included in the scope of the present invention.

The above-described embodiments relate to a photograph management system, but an embodiment capable of carrying out the present invention is not limited these embodiments. The present exemplary embodiment is also carried out as a pictorial guide book system for looking up a name of an object. In this system, for example, a user looks up a name of an animal or a plant that a user photographed during a trip but does not know its name. When the user specifies a photograph, the pictorial guide system according to the present exemplary embodiment performs a similar image search and a metadata search with use of the specified photograph as a query image in a similar manner to the above-described embodiments, and presents the metadata value having high closeness between the sets of the two search results as the name (candidate name) of the object.

According to the present exemplary embodiment, it is possible to present a metadata value representative of the image by evaluating "closeness" between sets of search results. Therefore, for example, a photograph of a dog can be prevented from being assigned a metadata value derived from a proper name such as the name of the pet, and instead a metadata value derived from the type of the dog can be presented. Further, for example, a photograph of an insect can be prevented from being assigned a too general metadata value such as "butterfly" or "beetle", and instead the name of the type such "striped blue crow" or "eophileurus chinensis okinawanus" can be presented. Then, the presented metadata value may be assigned to the photograph.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-232494 filed Oct. 6, 2009, which is hereby incorporated by reference herein in its entirety.

What is claimed is:

1. An information processing apparatus for assigning metadata to a target image content by using a processor, the information processing apparatus comprising:
    a storage unit configured to store a plurality of image contents with metadata assigned thereto;
    a first acquisition unit configured to acquire an image feature amount of the target image content;
    a similar image search unit configured to perform a similar image search by searching the plurality of image contents stored in the storage unit for image contents having a similar image feature amount to the image feature amount of the target image content;
    a second acquisition unit configured to acquire at least one metadata assigned to any of the image contents obtained as a search result of the similar image search;
    a selection unit configured to sequentially select one of the at least one metadata acquired by the second acquisition unit;
    a metadata search unit configured to perform a metadata search for the selected metadata by searching the plurality of image contents stored in the storage unit for image contents having the selected metadata;
    a calculation unit configured to calculate an overlap ratio of the image contents obtained as the search result of the similar image search and the image contents obtained as a search result of the metadata search for the selected metadata; and
    an assignment unit configured to assign the selected metadata to the target image content if the overlap ratio for the selected metadata exceeds a threshold.

2. The information processing apparatus according to claim 1, further comprising a counting unit configured to count an appearance frequency of the second metadata value acquired by the second acquisition unit,
    wherein the second search unit performs the second search using searches for a content having metadata value having a high appearance frequency counted by the counting unit.

3. The information processing apparatus according to claim 1, wherein the information assignment unit assigns the plurality of metadata with reliability based on the degree of similarity between the sets overlap of contents in the search results of the searches includes a degree of reliability of a metadata value.

4. The information processing apparatus according to claim 1, further comprising a specification unit configured to specify a content from the set of the search result of by the first search unit as a content from which the second metadata value is acquired or a content from which the second metadata value is not acquired.

5. An information processing method for assigning metadata to a target image content using a storage unit which stores a plurality of image contents with metadata assigned thereto, the information processing method comprising:
    acquiring an image feature amount of the target image content;
    performing a similar image search by searching from the plurality of image contents stored in the storage unit for image contents having a similar image feature amount to the acquired feature amount of the target image content;
    acquiring at least one metadata assigned to any of the image contents obtained as a search result of the similar image search;

sequentially selecting one of the at least one metadata acquired;
searching for the selected metadata from the plurality of image contents stored in the storage unit for image contents having the selected metadata;
calculating an overlap ratio of the image contents obtained as the search result of the metadata search for the selected metadata; and
assigning, the selected metadata to the target image content if the overlap ratio for the selected metadata exceeds a threshold.

6. A non-transitory computer-readable storage medium storing a computer program for causing a computer to execute the information processing method according to claim 5.

* * * * *